Figure 1:
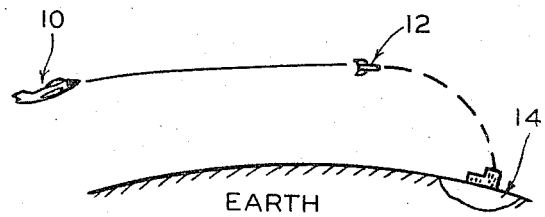

Feb. 28, 1967  L. E. VERBARG  3,307,179
CONTROLS OPERATION VERIFYING DEVICE
Filed June 25, 1958  3 Sheets-Sheet 1

INVENTOR.
LAWRENCE E. VERBARG
BY
Gravely, Lieder & Woodruff
ATTORNEYS

Feb. 28, 1967  L. E. VERBARG  3,307,179
CONTROLS OPERATION VERIFYING DEVICE
Filed June 25, 1958  3 Sheets-Sheet 2

INVENTOR.
LAWRENCE E. VERBARG
BY
*Gravely, Lieder & Woodruff*
ATTORNEYS

United States Patent Office 3,307,179
Patented Feb. 28, 1967

3,307,179
CONTROLS OPERATION VERIFYING DEVICE
Lawrence E. Verbarg, Kirkwood, Mo., assignor to McDonnell Aircraft Corporation, St. Louis, Mo., a corporation of Maryland
Filed June 25, 1958, Ser. No. 744,420
8 Claims. (Cl. 343—6)

The present invention relates generally to devices for verifying the operation of control devices and more particularly to a device for determining whether or not location determining equipment has functioned.

Many ways have been devised for determining the location of an object such as an airplane or missile in flight. These devices have been of various constructions and of varying degrees of accuracy. In the case of unmanned objects, such as guided missiles and the like, it is important to determine the in-flight location in order to steer the missile to the target. To this end it must be determined whether the missile controls have operated properly to evaluate the accuracy and reliability of the controls. Furthermore, in the case of a missile, it is important to know whether the missile was accurately directed to its target to be able to make an assessment or estimation of the probable damage produced thereby.

The successful operation of a guided missile, for example, depends on a chain of consecutive events, the occurrence of each event being dependent upon the successful occurrence of all previous events in the chain. The end event in such a chain has high probability of occurrence if it can be ascertained that an event near the end of the chain has occurred, and that the remaining events have such high probability of occurrence that their occurrence is almost certain.

In the method being described it is assumed that all events and functions that can be proven to have occurred will continue to occur, if applicable, throughout the remainder of the flight.

It is, therefore, an object of the present invention to provide means for ascertaining whether control equipment has functioned properly.

Another object is to provide means for relatively more accurately predicting the damage effected by a guided missile.

Another object is to provide means for indicating to a remote station whether a guided missile has functioned properly.

Another object is to provide information from which it can be determined whether or not a guided missile reached its target.

The present invention teaches the use and construction of an instrument which is adapted to be employed with other known equipment for determining the location of objects in flight and which comprises means responsive to the functioning of the known equipment for generating and transmitting a signal to a remote station to indicate whether or not the known equipment has performed properly and whether or not the object arrived at its target.

These and other objects and advantages of the present invention will become apparent after considering the following detailed specification in conjunction with the accompanying drawings.

Figure 4:
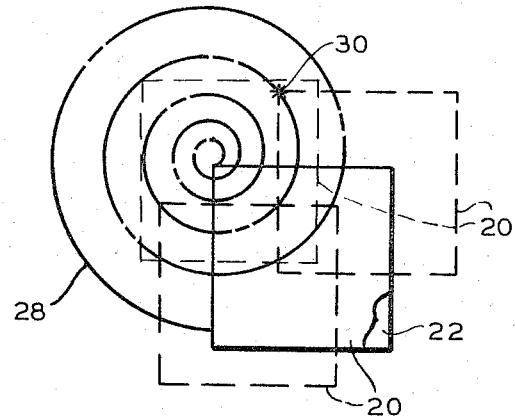
Figure 5:
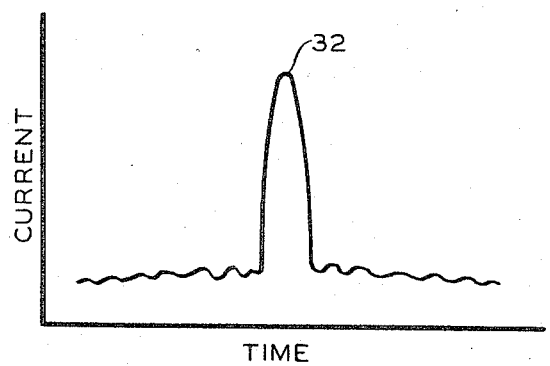
Figure 6:
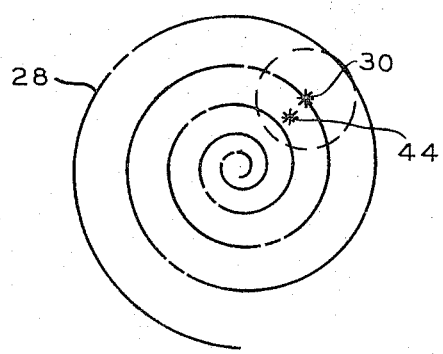
Figures 2, 3:
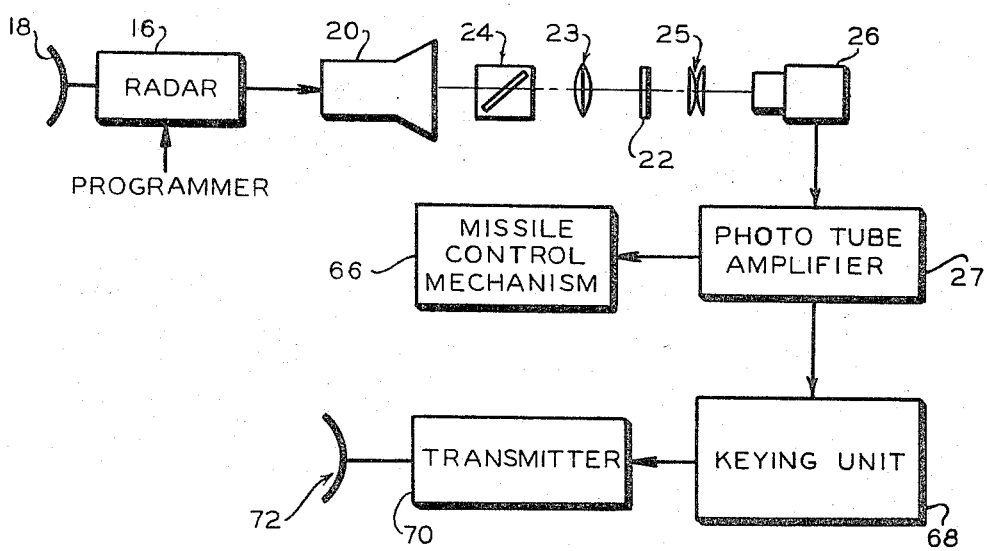
Figure 7:
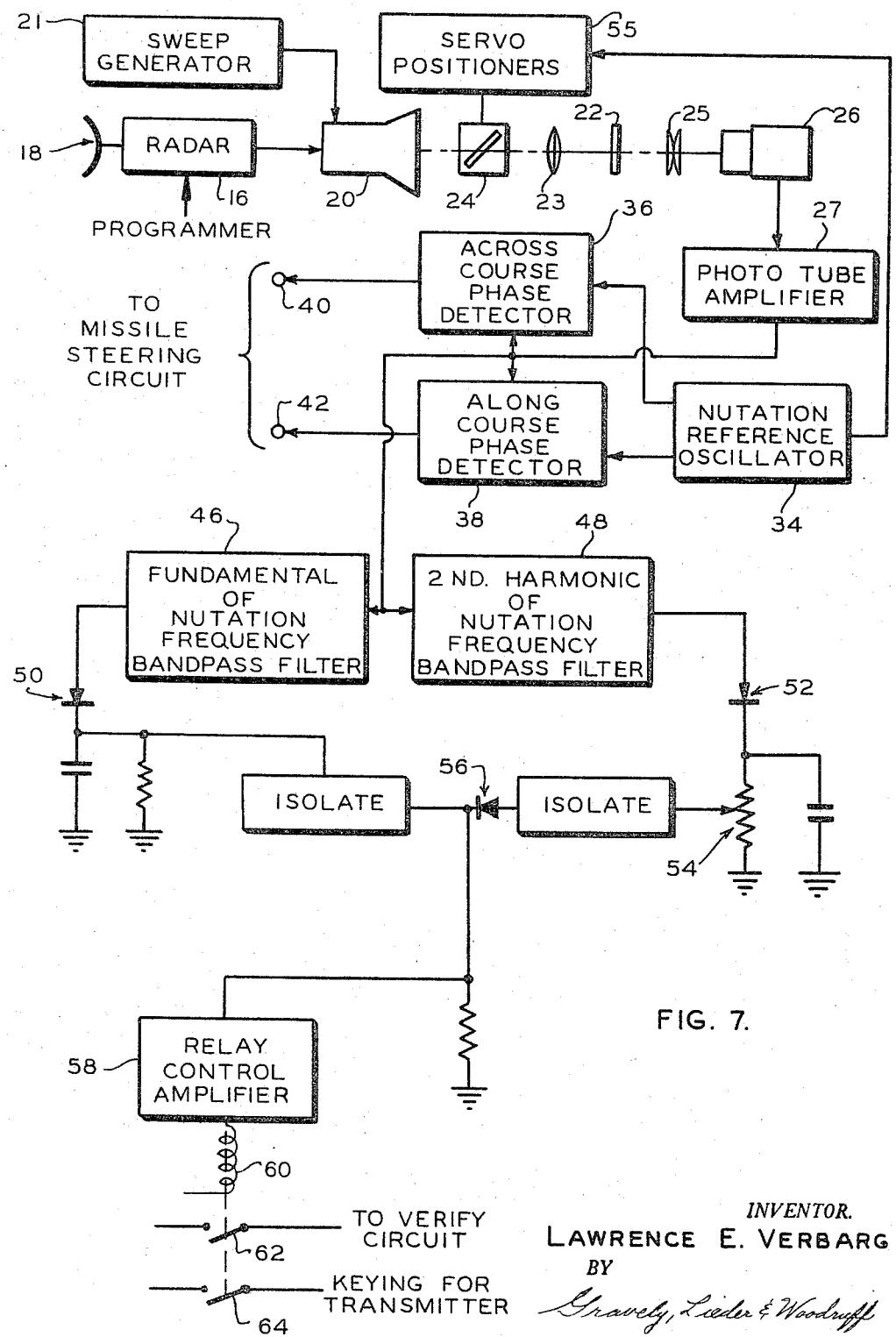

In the drawings:
FIG. 1 is an illustrative view showing the flight path of a guided missile;
FIG. 2 is a block diagram of a system including a device therein for verifying the functioning of known location determining equipment;
FIG. 3 is a view of the location determining equipment of FIG. 2;
FIG. 4 is a diagrammatic view to illustrate a typical first step in determining in-flight location by map matching;
FIG. 5 is a graph of the current in the phototube during the first step of map matching;
FIG. 6 is a diagrammatic view illustrating a typical second step in determining in-flight location by map matching; and
FIG. 7 is a view similar to FIG. 3 of the location determining equipment showing schematically the electrical circuits associated therewith.

Referring to the drawings by reference numbers, number 10 (FIG. 1) refers to an airplane from which a guided missile 12 is launched. The guided missile 12 is to fly a prescribed course and finally come down in a target area 14. In order to be reasonably certain that the missile 12 is guided to the target area 14 (without actually observing the missile or the target) it is necessary to determine the location of the missile before it reaches the target, and then by means of controls on the missile, guide the missile to the target. Before the missile controls can accurately guide the missile to the target, however, it must be determined that the location of the missile in flight is such that it can be guided to the target. It is this determination that is important to the present invention because it enables a relatively accurate estimation or prediction of probable damage done without actually having to witness the destruction. In an actual situation it is usually desirable to determine the location of the missile when the missile is fairly close to the target area, the theory being that if the missile can be guided to the target when only a relatively short distance therefrom, the chances of a hit are better than if the same information is determined during the early stages of its flight.

Controls for indicating the location of a missile in flight have been devised in the past, as well as control devices for directing the missile to the target. However, no known device will verify whether or not the controls have functioned properly while the missile is in flight and send back a signal to the launching airplane 10 or to another station which signal indicates that the controls in the missile have functioned properly, to what degree they have functioned properly, and therefore, the probability that the missile will hit in the target area. The present device is designed to send back such a signal to the airplane or other station when the missile controls have performed properly, and if desired, can also send back a signal to indicate improper operation of the missile or missile controls. By so providing, a prediction of the accuracy of the missile can be made, which prediction provides a relatively reliable assessment of the probable damage resulting therefrom.

For purposes of this disclosure, one form of in-flight position indicating equipment is described. In FIG. 2 this equipment is shown consisting of a device 16 carried on the missile which observes the earth's terrain and other characteristics. The device 16 has an antenna 18 which sweeps once across the area of the earth to be observed and feeds a signal responsive to the earth's features to a cathode ray tube 20 which is part of the device 16. The face of the tube 20 is swept by scanning impulses generated by sweep generator 21 (FIG. 7) in a known way, and the characteristics of the earth appear as an image thereon.

The image on the face of the cathode ray tube 20 is then compared with a reference display image which is present on a slide or frame member 22 (FIG. 3). The slide 22 is prepared in advance from known data about the area in question and has the important characteristics of the earth's surface in that area synthesized thereon to represent spacially the shape, locations and angular orientation of predominant radar ground targets or objects and the shadows associated therewith. The slide may consist of a transparent member which is shaded in accordance with predominant earth characteristics and should correspond with the earth's characteristics as they appear on the cathode ray tube which is energized by a radar or reflected signal.

Comparison between the image on the tube 20 and the image on reference slide 22 is accomplished optically (FIG. 3) by means of a servo lens system 24, a focusing lens 23, a condenser lens system 25, and a phototube 26 and phototube amplier 27. The locations of the earth's characteristics on the reference slide 22 should correspond with the locations of similar objects on the cathode ray tube 20 if the two images are to match. The method of comparing these images is known as map matching. If the predominant characteristics appear as bright spots on the tube 20 and as transparent areas on the slide 22, then maximum light reaching the phototube 26 will usually indicate a matched condition. When the maps match (or substantially match) it indicates that the missile is on or near its proper flight course and probably can be guided to the target area 14.

It is also anticipated that minimum light from the cathode ray tube 20 falling on the phototube 26 could be used as well as maximum light readings. If this were done, then the reference frame 22 would be dark or opaque in the areas corresponding to the bright spots on the tube 20, and minimum light reaching the phototube 26 would determine a proper match instead of maximum light.

The first step in establishing the match condition is made with the tube 20 optically aligned with the slide 22. In this position, however, the map images usually will not match. Therefore, it is necessary to effectively move one map relative to the other to find the point at which the maps most nearly match. This is done primarily to determine to what extent the missile is off course and to provide information for adjusting the missile controls to direct the missile to the target area 14. Determining the position of best match provides this information, and to determine the matched condition, two sets of searches are made.

The first search consists of optically moving the radar image as it appears on the tube 20 along a search path described by a spiral 28 (FIG. 4). The search path is started from a position in which the reference slide 22 and the cathode ray tube 20 are in approximate alignment, and the image on the tube 20 is moved in the plane thereof along the spiral 28. As the image moves, a record is made of the light intensities (in terms of current) reaching the phototube 26, and this record is stored in a memory unit (not shown). When the first search is over, the image is optically moved by suitable servomotors (not shown) to the position on the spiral path 28 where the maximum (or minimum) light intensity was indicated. This spot on the spiral 28 is indicated by number 30 (FIGS. 4 and 6), and by the corresponding current peak 32 in FIG. 5 and provides an indication of near-maximum correlation between the maps. In FIG. 4, three positions of the image on the tube 20 are shown in phantom outline as the image is moved along the spiral path 28 (one corner of the image 20 being used as the reference to illustrate the relative movement along the spiral path 28). It is anticipated that the tube 20, the slide 22, or the optical system could be moved to produce the matching spiral 28, and it is anticipated that a path other than a spiral could be used, if desired.

It is not practical to have the turns of the spiral 28 close enough to cover all possible positions of comparisons between the two maps. Therefore, the point of maximum light may actually be located between two adjacent turns of the spiral and for this reason a second search is made.

The second search for maximum light is made in so-called nutations which is a method of dynamic map matching and consists of optically moving the image on the tube 20 in a circle about the point 30 on the spiral where maximum light intensity resulted. The dynamic match phase is initiated by causing the cathode ray tube presentation to effectively nutate with respect to the image on the slide 22 at a frequency determined by a reference oscillator 34 (FIG. 7). The output of the phototube amplifier 27 is fed during the dynamic matching operation to phase detectors 36 and 38 and the phase detectors 36 and 38 are arranged to provide control impulses at terminals 40 and 42 respectively for guiding the missile to the target area 14.

During the nutation search, a point 44 (FIG. 6) of maximum light corresponding to the matched position of the map images is obtained. When the second search is complete, the guidance controls on the missile can be accurately adjusted to direct the missile to the target area 14. The total time required for determining the matched condition and correcting the missile controls is relatively short.

Location finding equipment as described herein has been devised heretofore. However, in the existing devices no provision is made for signaling the success or failure of the equipment to a remote receiver, and no way is provided for indicating the probable success or failure of the missile. If such information is obtained at all it would have to be through the use of reconnaissance missions or some other visual inspection program.

With the present device, however, it is possible to check the accuracy of the control devices and the approximate location of the missile during its final moments of flight and receive a signal at the launcher or at a ground station which indicates whether or not the missile mission is successful. Obviously in the case of a missile, if the destructive power is known, and if it is also known that the missile probably landed in the target area 14, a relatively accurate estimation of the probable damage can be made.

The present device, therefore, consists of an instrument capable of recognizing and evaluating (electronically) the relative strength of a signal produced on the phototube 26, which signal gives a good indication of the probable success of the missile, and of transmitting a signal to a remote receiver indicating to the receiver the probability of success or failure of the missile to reach the target area.

If the frame 22 is constructed fairly accurately by including many distinguishing features of the ground, the matched condition will be indicated by a relatively sharper current peak such as the peak 32 in FIG. 5, and the matched condition will be relatively easier to detect In general either of two methods may be used for verifying that the map matching equipment has functioned properly.

The first method makes use of the fact that the voltage from the phototube, when observed as a function of relative displacement along the spiral path, may be expected to produce a very sharp peak at the position of near-maximum correlation where the maximum light reaches the phototube 26 through the simulated map 22. The ratio of the true peak (at the match condition) to the next highest peak or to the average noise level may be compared to a preselected value. If the ratio is greater than the preselected value, verification is indicated and a verification signal is transmitted. If the ratio does not exceed the predetermined value, some malfunction is indicated and either no signal is transmitted or a signal is transmitted to indicate the malfunction.

The second method makes use of the fact that the ratio of the second harmonic to the first harmonic of the phototube output as a function of time during the dynamic match phase increases sharply when near-maximum correlation is achieved. By comparing this ratio to a preselected value, the accuracy of the correlation can be determined. For example, a case in which the second harmonic is three or more times larger than the first harmonic might be used as an arbitrary preselected value. This second method is shown in FIG. 7.

In this method the output signal from phototube amplifier 27 is transmitted to two filters 46 and 48 simultaneously. The filter 46 is tuned to pass the fundamental frequency of the nutation reference oscillator 34 which oscillator generates a position signal for the servo positioners 55 associated with the servo lens system 24, and phase reference signals for the phase detectors 36 and 38; and the filter 48 is tuned to pass the second harmonic of the nutation reference oscillator 34. The signal passing through each filter is detected or rectified by rectifiers 50 and 52 respectively to establish a direct voltage proportional to the amplitude of its respective signal. The full detected voltage from the fundamental frequency filter 46 is compared with a preselected fraction of the full detected voltage from the second harmonic frequency filter 48. The preselected fraction is set by means of a voltage divider potentiometer 54. When the preselected fraction of the detected second harmonic voltage exceeds the full detected fundamental frequency voltage, another rectifier 56 connected between the outputs of the filters 46 and 48 causes a voltage to appear at the input to a relay control amplifier 58 which in turn energizes a relay 60 therein. Energizing of the relay 60 closes relay switch contacts 62 and 64 which respectively feeds a signal to the missile steering system 66 and a keying unit 68 for a transmitter 70 to transmit a verifying signal from antenna 72.

The reason for using ratios in both methods instead of merely setting an arbitrary floor for the magnitude of the phototube output at matched condition, is to take into account factors which might vary considerably in different situations. For example, the accuracy of the synthesized map may vary, the weather conditions may vary, and many other conditions may be different in different situations causing the ability of the equipment to match maps to vary. Therefore, the relative ability of the equipment to match maps is more important than its ability according to a fixed arbitrary standard. It is anticipated, however, that an arbitrary fixed value could be used, if desired.

If the missile is on course, and the map images match the signal produced thereby will energize the transmitter 70 and send a signal from antenna 72. If, on the other hand, the missile is off course or the equipment failed (or both) this condition may be indicated either by the absence of a transmitted signal or by transmitting a signal different from the signal indicating a successful flight.

For line of sight operation, the same radar which was used to scan the earth may also be used to transmit the signal to the remote receiver. For further transmissions, lower frequencies are required and the body of the missile itself can be used as the antenna.

Thus it is apparent that there has been shown and described a device that sends out a signal from an in-flight guided missile or the like to a remote receiver indicating whether or not the missile is on course and is operating properly which device fulfills all of the objects and advantages sought therefor. Many changes, alterations and modifications of the present device will be apparent to those skilled in the art, and all such changes, alterations and modifications which do not depart from the spirit and scope of this invention are deemed to be covered by this invention which is limited only by the claims which follow:

What is claimed is:

1. In a guided missile equipped with an instrument for determining its in-flight location in which said instrument has a simulated map member showing the earth's characteristics over a selected area, radar means including a cathode ray tube and an antenna for producing a picture of the earth's characteristics over a selected area on the cathode ray tube and means for comparing the simulated picture with the radar picture, and in which said comparing means includes means for producing an electric impulse which varies in proportion to the similarities between the simulated and radar pictures; the improvement of means responsive to the electric impulse of the comparing means, and transmitter means energized by the impulse responsive means when the impulse exceeds a predetermined level for transmitting a signal indicating said condition.

2. In a guided missile equipped with an instrument for determining its in-flight position relative to the ground, said instrument including means for optically matching a simulated picture display of an area of the earth's surface with a display of an area of the earth's surface produced electronically on a cathode ray tube during flight; the improvement of providing light responsive means in association with the optical matching means, said light responsive means generating an electric impulse which varies in proportion to the ability of the optical system to match the simulated picture display to the display produced electronically, means for selecting impulses which exceed a predetermined amplitude, and transmission means initiated by impulses which exceed said predetermined amplitude for transmitting an indication thereof from the missile.

3. A guided missile comprising an instrument for determining its in-flight position, said instrument including map matching mechanism for comparing an observed image of an area of the earth's surface with a synthesized image thereof, means associated with said map matching mechanism for producing an electrical impulse which varies in proportion to the matched similarities between the characteristics of the synthesized image and the observed image, signal generating means responsive to said electrical impulse when said impulse exceeds a preselected value, and transmitter means energized by said signal generating means for transmitting an indication of said signal from the missile.

4. A guided missile comprising an instrument for determining its in-flight position, said instrument including map matching mechanism for comparing a radar observed area of the earth's surface with a synthesized image thereof, means associated with said map matching mechanism for producing an electrical impulse which varies in proportion to the matched similarities between the characteristics of the synthesized image and the observed image, signal generating means responsive to said electrical impulse when said impulse exceeds a preselected value, and transmitter means energized by said signal generating means for transmitting an indication of said signal from the missile.

5. A guided missile comprising an instrument for determining its in-flight position, said instrument including a syntheszed image of the earth's characteristics over a given area, means for observing and producing an image of the earth's characteristics in a preselected area during flight of the missile, and means for comparing said synthesized image with the observed image to determine the location of the missile at the time that the observation is made, photosensitive means responsive to the similarity between the characteristics on the synthesized image and the observed image for producing an electrical impulse responsive thereto, means for electronically evaluating said impulse for determining the degree of similarity between said images, and transmitter means energized by said impulse for sending a signal when the degree of similarity exceeds a predetermined value.

6. A guided missile comprising a missile body having an instrument therein for determining its in-flight position, said instrument including a synthesized image of the earth's characteristics in a preselected area, means for observing and producing an image of an area of the earth's characteristics during flight of the missile, and means for optically comparing said synthesized image with the observed image, said comparing means including nutating means for optically moving one of said images relative to the other image at a preselected frequency and photosensitive means for producing an electrical impulse containing harmonics of said nutation frequency, means for comparing the ratio of two of said harmonics, and transmitter means energized by said electrical impulse whenever the ratio of said harmonics exceeds a predetermined value for transmitting a signal from the missile indicating said condition.

7. A guided missile comprising an air frame having an instrument therein for determining its in-flight location, said instrument including a synthesized image of the earth's characteristics over a given area, means for observing and producing an image of an area of the earth's characteristics during flight of the missile, means for comparing said synthesized image with the observed image to determine the location of the missile at the time that the observation is made, photosensitive means responsive to the similarity between the characteristics on the synthesized image and the observed image to produce an impulse containing a fundamental and side band frequencies, means for electronically evaluating said impulse to determine the ratio between two frequencies in said impulse, and transmitter means energized by said evaluating means whenever the ratio of said frequencies exceeds a predetermined value for transmitting a signal from the missile.

8. A guided missile comprising an air frame having an instrument therein for determining its in-flight location, said instrument including a synthesized image of a preselected ground area indicating the important characteristics thereof, means for observing and producing an image of an area of the earth during flight, and photosensitive means for optically comparing the observed image with the synthesized image and for producing an electrical impulse proportional to the degree of comparison between said images, means for optically moving one of said images relative to the other image for varying the electrical impulse produced by said photosensitive means, electrical means for analyzing the impulse in terms of its electrical properties, and transmitter means energized by said electrical means whenever the properties of said impulse meet preselected standards for transmitting a signal from the missile.

References Cited by the Examiner

UNITED STATES PATENTS 2,526,682  10/1950  Mulberg _____ 244—14.4
2,649,262   8/1953  Fahrney _____ 244—14.5

FOREIGN PATENTS 997,187  1/1952  France.

RODNEY D. BENNETT, *Acting Primary Examiner.*

NORMAN H. EVANS, CHESTER L. JUSTUS,
*Examiners.*

D. G. REDINBAUGH, D. C. KAUFMAN,
*Assistant Examiners.*